US006185410B1

(12) United States Patent
Greene

(10) Patent No.: US 6,185,410 B1
(45) Date of Patent: Feb. 6, 2001

(54) REMOTE TRANSMITTER AND METHOD

(76) Inventor: Ted R. Greene, 1247 Silverado, La Jolla, CA (US) 92037

( * ) Notice: Under 35 U.S.C. 154(b), the term of this patent shall be extended for 0 days.

(21) Appl. No.: 08/960,604

(22) Filed: Oct. 29, 1997

(51) Int. Cl.$^7$ ..................................................... H04B 1/34
(52) U.S. Cl. .......................... 455/100; 455/128; 455/575
(58) Field of Search ................................... 379/45, 38, 40, 379/39, 37; 340/574, 325, 573, 514, 539; 455/575, 100, 550, 90, 128; 342/357, 457; 200/5 EA, 16 R, 547, 548, 549, 550, 293.1, 33, 1, 232.1, 232.2

(56) References Cited

U.S. PATENT DOCUMENTS

| | | | |
|---|---|---|---|
| 3,827,039 | * 7/1974 | Agnese | 340/227.1 |
| 3,848,249 | * 11/1974 | Meiri | 340/325 |
| 3,929,210 | * 12/1975 | Cutler et al. | 191/12.2 R |
| 4,692,749 | * 9/1987 | Bussing, Jr. | 340/574 |
| 4,815,143 | * 3/1989 | Derhaag et al. | 381/168 |
| 5,115,224 | * 5/1992 | Kostusiak et al. | 340/574 |
| 5,167,356 | 12/1992 | Williams | 224/202 |
| 5,241,590 | 8/1993 | Deakins et al. | 379/356 |
| 5,305,370 | * 4/1994 | Kearns et al. | 379/45 |
| 5,365,570 | 11/1994 | Boubelik | 379/59 |
| 5,388,144 | 2/1995 | Nichols | 379/40 |
| 5,465,388 | 11/1995 | Zicker | 455/33.1 |
| 5,512,881 | * 4/1996 | Majmudar | 340/574 |
| 5,710,989 | * 1/1998 | Flood | 455/100 |
| 5,742,233 | * 4/1998 | Hoffman et al. | 340/573 |
| 5,877,675 | * 3/1999 | Rebstock et al. | 340/286.07 |

* cited by examiner

Primary Examiner—Thanh Cong Le
Assistant Examiner—Charles Chow
(74) Attorney, Agent, or Firm—Townsend and Townsend and Crew LLP

(57) ABSTRACT

The present invention provides devices, systems, and methods for remotely activating a controller. In particular, the invention provides devices operable through a user's tactile sensation and easily operable for the elderly and the very young. In one embodiment, the present invention provides a remote transmitter for use with a controller such as a telephone base unit. The transmitter comprises a housing and a signal transmitter coupled to the housing. A switch device having a signal on position and a signal off position is also coupled to the housing. A user input connected to said switch device extends a sufficient distance from the housing to allow the user to locate and manipulate the user input through tactile sensing. When the user manipulates the input to move the switch device to the signal on position, the switch device activates the signal transmitter which sends signals to a telephone and causes the dialing of a selected telephone number.

23 Claims, 12 Drawing Sheets

REMOTE TRANSMITTER AND METHOD

BACKGROUND OF THE INVENTION

The present invention relates generally to switch devices. Specifically, the present invention is directed to an easily operable switch on a remote transmitter for use in a telephone number dialing system. The present invention is of particular value to those individuals who must rely on tactile sensing to activate the transmitter, either because they are unable to visually operate the transmitter or because they have become partially incapacitated.

Due to the high cost of in-patient health care for the physically incapacitated, the increasing expense of convalescent homes for the aged, and the desire of many such persons to be independent, the numbers of aged persons or those with fragile health who elect to live alone are becoming very large. The changing economics of society has also resulted in many young children being at home alone after school or when their parents are away at work. The lack of supervisory care for these people has lead to a potentially dangerous situation in the household.

In many crises or accidents, especially those in a household setting, one of the initial considerations is to alert an outside party to the situation in the household. This typically involves placing a telephone call to a local emergency response number such as the well-known 911 number or to a relative or neighbor for situations that are less urgent. Unfortunately, either due to injury or some other emergency related side-effects, the very young or very old when living alone may become physically unable to place a call for help, preventing help from arriving at an early stage. Moreover, incapacitated individuals may be unable to reach the telephone or they may be unable to dial the telephone even if they can reach it.

Numerous dialer systems have been devised over the years in which a preselected telephone number is dialed automatically in order to alert the dialed number of an emergency. Typically, these systems are activated with a small remote transmitter similar to a conventional garage door opener. The transmitter is typically worn by the user, either around the neck or on the wrist. The transmitters are activated by pressing a button or some other depression-activated device on the transmitter. Typically such transmitters only send signals while the switch remains depressed.

Ordinary switches or buttons, however, are not optimally suited for activating such a transmitter. In high stress situations, conventional switches or buttons may become too difficult to operate. A toggle switch, for example, requires two hands, one to hold the transmitter and the other to flip the switch. Ordinary push-button devices may be too small to locate or are activated for too brief a period of time to be effective. Such buttons are further susceptible to false operation when the wearer leans against an object or, in the case of a cardiac patient, turns over in bed.

Hence, an improved transmitter is needed which has a switch that is operable with one hand, requires minimal amounts of space, and cannot be operated by pressures incident to normal activities. Preferably, the device should be operable through tactile sensation alone, particularly when a person has fallen and is unable to visually guide their hand to activate the transmitter. Furthermore, the transmitter should provide visual cues that it has been activated and be simple enough that even young children can understand the type of motion needed to activate the transmitter. The improved transmitter could have a plurality of uses such as with hospital beds for alerting nurses of patient emergencies or as a triggering mechanism for an anti-theft system and thus is not confined to use in telephone-based systems.

SUMMARY OF THE INVENTION

The present invention provides devices, systems, and methods for remotely contacting a controller. In particular, the present invention provides a remote transmitter that can withstand the rigors of day-to-day activity without falsely contacting or activating a controller such as a telephone dialing system. More particularly, the invention provides a remote transmitter having a switch that is actuatable through a user's tactile sensation and easily operable by the elderly and the very young.

In a first aspect, the present invention provides a remote transmitter for use with a controller, such as a telephone base unit. The remote transmitter comprises a housing and a signal transmitter coupled to the housing and a sliding element for activating the signal transmitter. The sliding element which moves to a signal on position and activates the signal transmitter when said element is moved away from the center of the housing. The housing may have a linear path and the sliding element may translate along the path between a signal off position and the signal on position. The sliding element may also include a lip for engaging a plurality of notches along said linear path of the housing. Typically a user input is connected to the sliding element, and the input extends a sufficient distance from the housing to allow the user to locate and manipulate the user input through tactile sensing. When the user manipulates the input or the sliding element, the signal transmitter sends a transmission, typically a digitally coded signal, to a telephone and causes the dialing of a selected telephone number.

The user input of the present invention may comprise of a variety of different types of inputs so long as they provide an easily graspable object for the user. Typical examples of a user input include a flexible cord, a firm rod device, or perhaps even the housing molded to provide a contoured, ergonomic fit with the user's hand. Generally, the input is moved away from the center of the device to activate the signal transmitter.

In another aspect, the present invention provides a system using a remotely activated transmitters such as a system for remotely activating and dialing telephone numbers. In this embodiment, the system comprises a telephone base unit, a signal receiver on the base unit, and a remote transmitter having a signal transmitter and a user input for activating the signal transmitter to send signals to the signal receiver on the base unit. An automatic telephone number dialer on the telephone base unit can be activated by the signal receiver to dial a selected telephone number. The system also has an automatic message sender, which sends a prerecorded message to the selected telephone number, and a speakerphone on the base unit to provide two-way communication after the prerecorded message has been sent. Typically, a timer device on the base unit sets a fixed time period for two-way communication.

These and other embodiments of the present invention, as well as its advantages and features, are described in more detail in conjunction with the text below and attached figures.

DETAILED DESCRIPTION OF THE SPECIFIC EMBODIMENTS

The present invention provides devices, systems, and methods for the activating a remote transmitter. In particular, the present invention is useful for providing a simple, rugged transmitter which can be operated through tactile sensing alone. Although the device may find a variety of uses outside the realm of communications equipment, the device is particularly suited for use with a remotely activated telephone dialing system.

Figure 1:
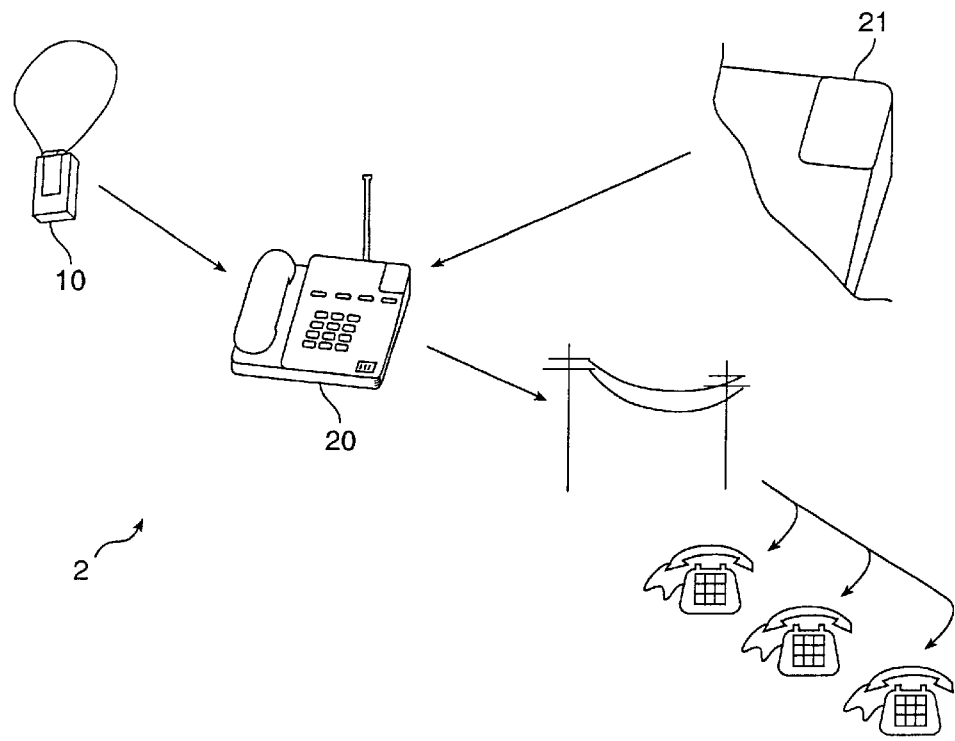
FIG. 1 is an overview of the operation of a remotely activated telephone dialing system.

FIG. 1 is a broad overview of a remotely activated telephone number dialing system 2 for use with the present invention. The system 2 generally comprises a remote transmitter 10 and a telephone base unit 20. The remote transmitter 10 is typically located apart from the base unit 20 and worn on the user or physically attached in some other manner to the user's body. The transmitter 10 is capable of sending a transmission such as a digitally coded signal for activating the telephone base unit 20. Alternatively, if the user is within the vicinity of the telephone base unit, the user may press an emergency dialing button located on the telephone base unit to activate the unit 20. Once activated, the telephone base unit 20 will perform a calling procedure comprising one or more predetermined actions. Typically, the first of such predetermined actions involves dialing a selected telephone number of a party the user wishes to contact. Once a connection with the selected number has been established, the telephone base unit may send a prerecorded message to the party at the selected telephone number. After the prerecorded message has been delivered, the telephone base unit may further activate a speakerphone 26 (FIG. 2) on the base unit to allow two-way communication between the user of the remote transmitter and the party located at the selected telephone number. Once a set of predetermined actions has been completed, the telephone base unit may dial another selected telephone number and repeat the predetermined actions for each remaining telephone number, as will be described in further detail below. The telephone base unit may continue to dial each selected telephone number until the predetermined set of actions have been completed for each of the selected telephone numbers.

Figure 2:
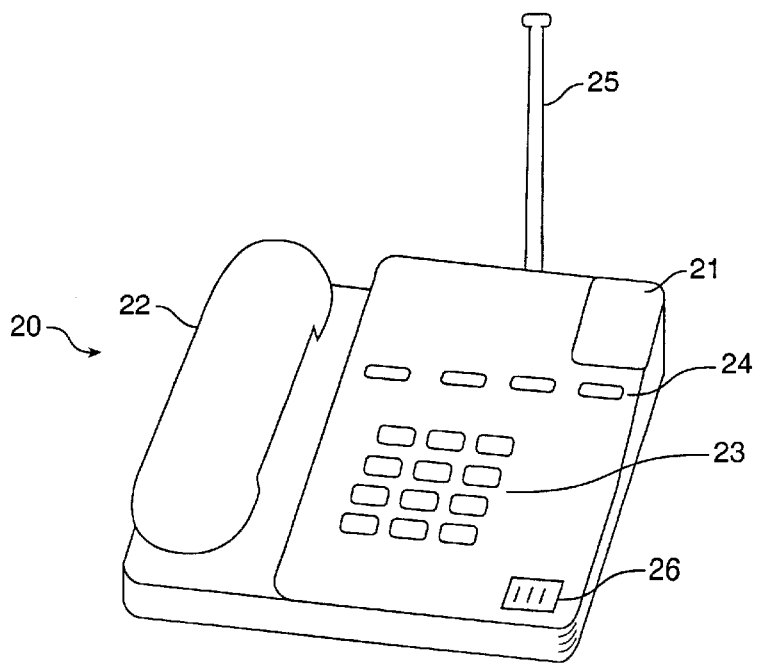
FIG. 2 shows a perspective view of a representative telephone base unit of the present invention.

FIG. 2 is a perspective view of a representative telephone base unit 20 of the present invention. As shown in FIG. 2, telephone base unit 20 comprises a handset 22, a dialing keypad 23 for conventional operation of the telephone, a plurality of one-touch dialing buttons 24 to facilitate dialing of preselected telephone numbers, and an antenna 25 for receiving signals such as a digitally coded message from the remote transmitter worn by the user. The large rectangular button located at the upper right corner of the present telephone base unit is the emergency dialing button 21 for activating the telephone base unit 20 without using the transmitter 10. The emergency dialing button 21 may be located in a variety of positions on the telephone base unit 20 and oriented in several different manners, so long as the button 21 presents an easily locatable and identifiable interface for the user in an emergency situation. A speakerphone 26 is also provided on the base unit 20.

Figure 3:
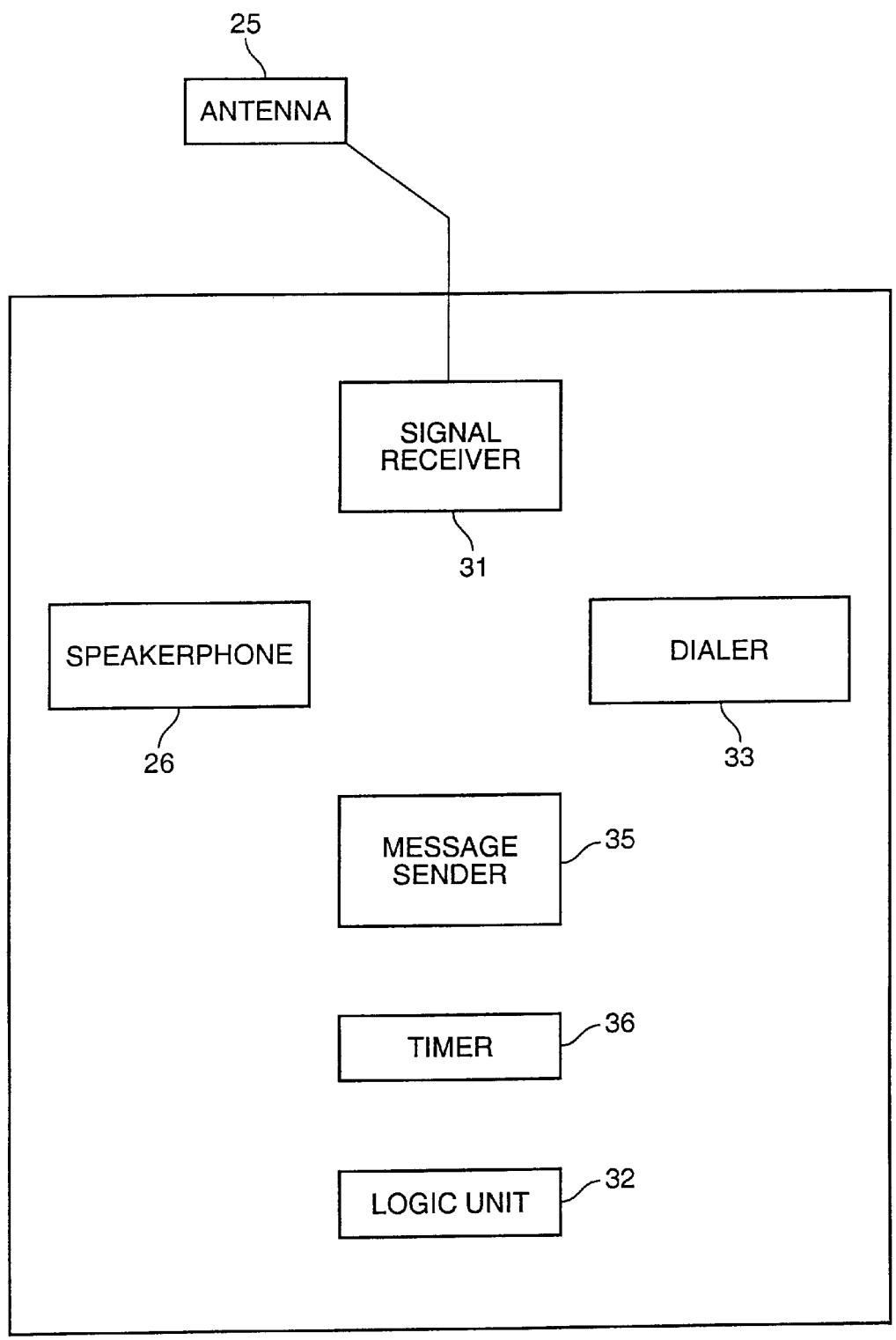
FIG. 3 is a schematic illustration of components within the telephone base unit.

Referring now to FIG. 3, the telephone base unit 20 further comprises additional components for providing the predetermined actions desired by the user of the present invention. Although each component will be described separately, it is understood and well known in the art that the functionality of these components may be combined into a single component. As shown, a signal receiver 31 is linked to the antenna 25 (see FIG. 2). The signal receiver 31 will ascertain if the signal received by the antenna 25 correctly matches the signal expected from the remote transmitter 10. Only those signals identified as coming from remote transmitter 10 will activate logic unit 32 which will proceed to coordinate and execute the calling procedure for the telephone base unit 20. In alternative embodiments, the signal receiver 31 may be able to process signals coming from a plurality of different remote transmitters 10. The signals may also provide different information, such as the location and position of the user. An automatic telephone dialer 33, a speakerphone 26, and an automatic message sender 35 allow the unit to perform the predetermined set of actions as prescribed by the user in the calling procedure. It is recognized that depending on the desired user function of the telephone base unit 20, not every unit will have all components or functionalities as described herein.

Figure 4A:
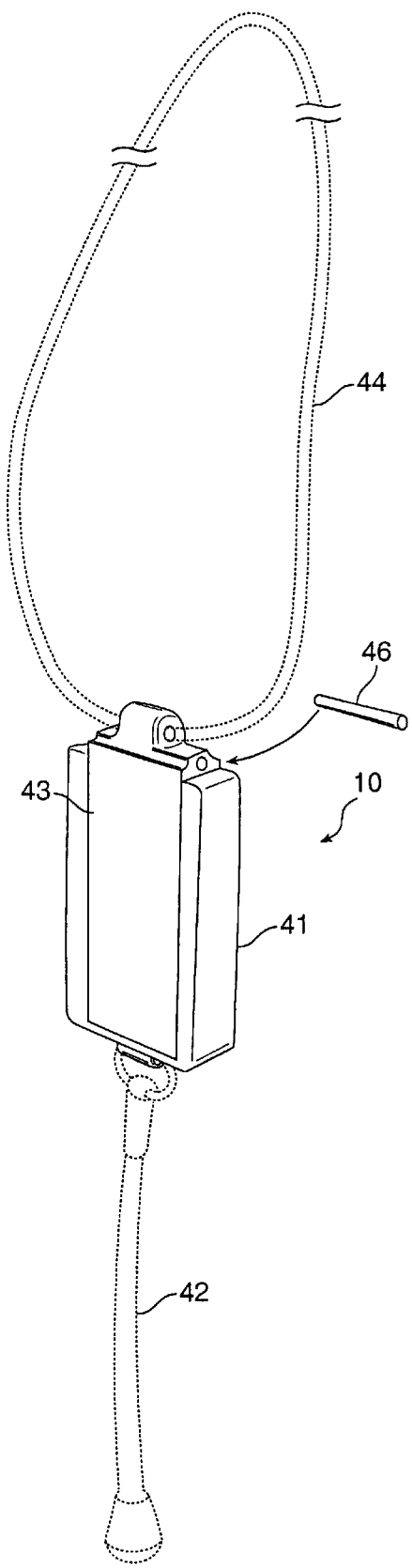
FIGS. 4A–4F show various views of the remote transmitter of the present invention.
Figure 4B:
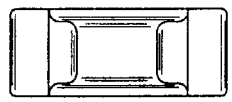
Figure 4C:
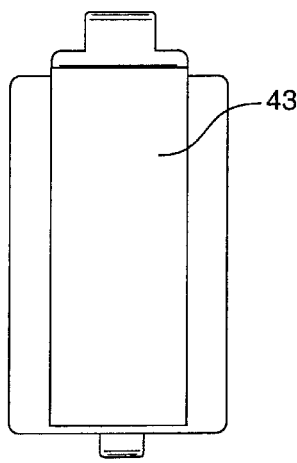
Figure 4D:
Figure 8A:
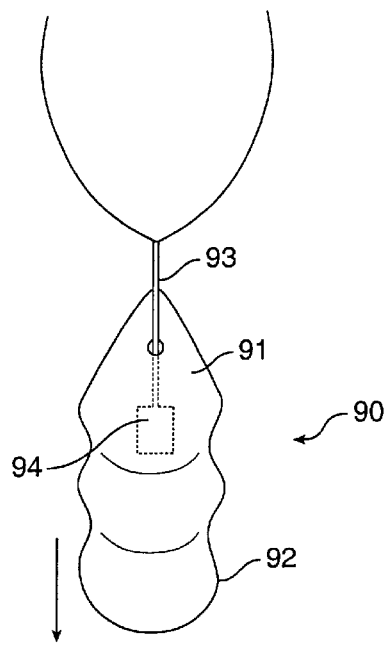
FIGS. 8A–8B depict a still further embodiment of remote transmitter having ergonomic grooves and a flexible slide element.
Figure 8B:
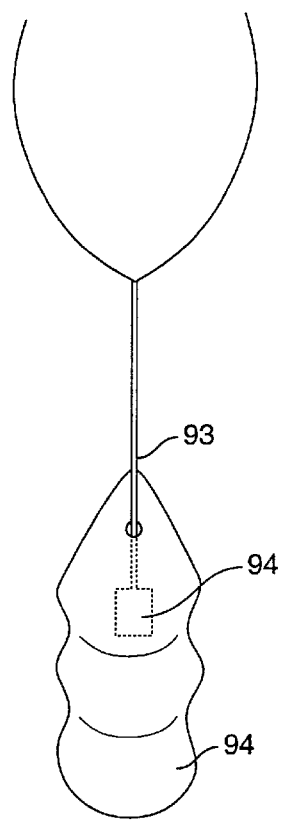

Referring now to FIGS. 4A–4E, a preferred embodiment of a remote transmitter 10 will now be described. The preferred embodiment of the transmitter 10, as depicted in FIGS. 4A–4E, reveals a necklace-type pendant to be typically worn around the user's neck or possibly attached to the user in some other fashion, such as around the waist or slung across the shoulder. As shown in the perspective view of FIG. 4A, the preferred embodiment of the remote transmitter 10 typically comprises a housing 41, a user input 42 connected to the housing 41, a sliding element 43, and a cord 44 or some other looping device for removably securing the remote transmitter to the body of the user. The user input may comprise of an elongate element as shown in FIG. 4A. Alternatively, when there is no user input 42, some other part of the transmitter 10 such as housing 91 as shown in FIGS. 8A–B (discussed below), may be used to activate the signal transmitter.

The housing 41 of the present invention is preferably made of a lightweight corrosion-resistant material to allow the remote transmitter to survive the rigors of day-to-day activity of the user. For example, the housing may be made of hardened polymer materials or plastics to provide the desired housing characteristics. A polymer sealing element 44A at joining locations (FIG. 5A) on the housing 41 provides water resistance for the remote transmitter.

Figure 4E:
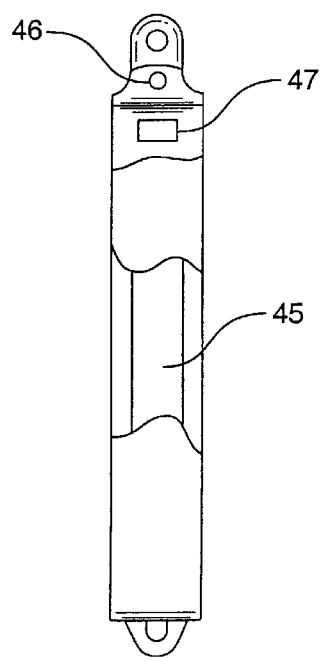
Figure 4F:
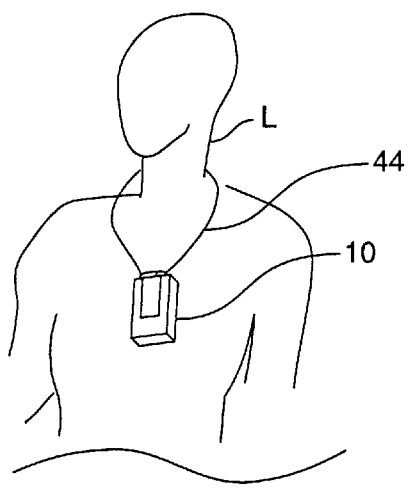

As shown in FIG. 4E, which depicts a partial cross-section of a side view of the remote transmitter, a signal transmitter 45, typically comprising a signal transmitting circuit, is contained within housing 41. It is the signal transmitter 45 that sends preferably a digitally coded signal to the signal receiver 31 on telephone base unit 20. The signal transmitter 45 operates in a cordless manner relying on radio frequency or other cordless technology to transmit the digitally coded signal to the base unit 20 without the use of wires. In certain alternative embodiments, the signal transmitter 45 maybe hardwired to a controller such as a telephone base unit or a nurse's station and thus not employ cordless technology (discussed below). Hardwired systems employing the sliding element type switch of the present invention are particularly useful when the user is typically immobile such as a patient in a hospital bed, or if the switch device has fixed locations such as with a fire alarm or prison security alarm. In still further embodiments, the signal transmitter 45 may itself be a cellular signal transmitter which can eliminate the need for a telephone base unit and perform the predetermined actions directly. The transmitter 45 may also be adapted to send signals containing information such as the location of the transmitter.

As shown in FIGS. 4A–H and 5A, the remote transmitter 10 of the present invention does not use ordinary switches or buttons to trigger the sending of the digitally coded message. In a high stress situation, a conventional switch becomes too difficult to operate. The user may have fallen and become unable to visually operate the switch. With some elderly users, motor skills may have deteriorated so that only large muscle movements such as pulling are possible. Furthermore, ordinary push button switches are susceptible to false operation when the wearer leans against an object, or in the case of a cardiac patient, turns over in bed.

In a preferred embodiment, remote transmitter 10 (FIG. 5A) uses a sliding element 43 to activate the signal transmitter 45 within housing 41. The sliding element 43 will not be activated accidentally when the user leans against an object or accidentally drops the remote transmitter 10. The sliding element 43 travels along a linear path 51 of the housing to move away from the center of the remote transmitter housing 41. The sliding element 43 moves between a first position corresponding typically to a signal off position, and a second position typically corresponding to a signal on position. Notches 52 and 53 (hidden lines) in the linear path 51 denote first and second positions of the sliding element 43. Sliding element 43 has a lip 54 (FIG. 5B) located near a distal end of the sliding element for engaging notches 52 and 53 to releasably secure the sliding element 43 in either the first or second positions. A plurality of lips 54 and 55 (FIG. 5B) may be used on element 43 to engage the various notches 52 and 53 on the housing 41. The amount of engagement and interference between the notches and the lip 54 are adjustable in design to set the amount of force required to move the element 43. Typically, the force required will be between about 1 to 5 lbs, preferably about 3 lbs.

Figure 4G:
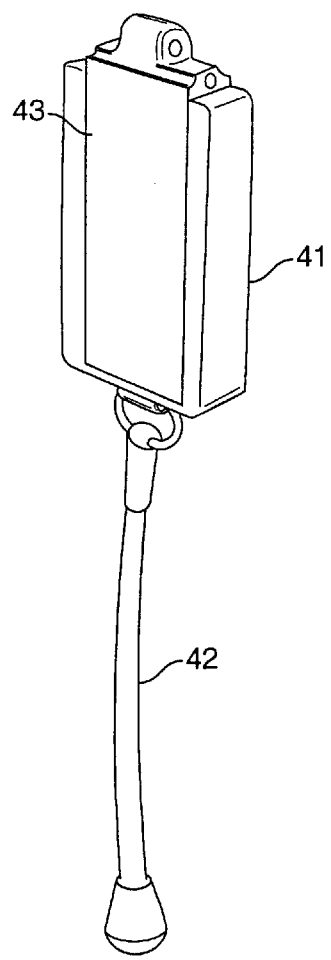
FIGS. 4G–4H show an alternate embodiment of the remote transmitter of the present invention.
Figure 4H:
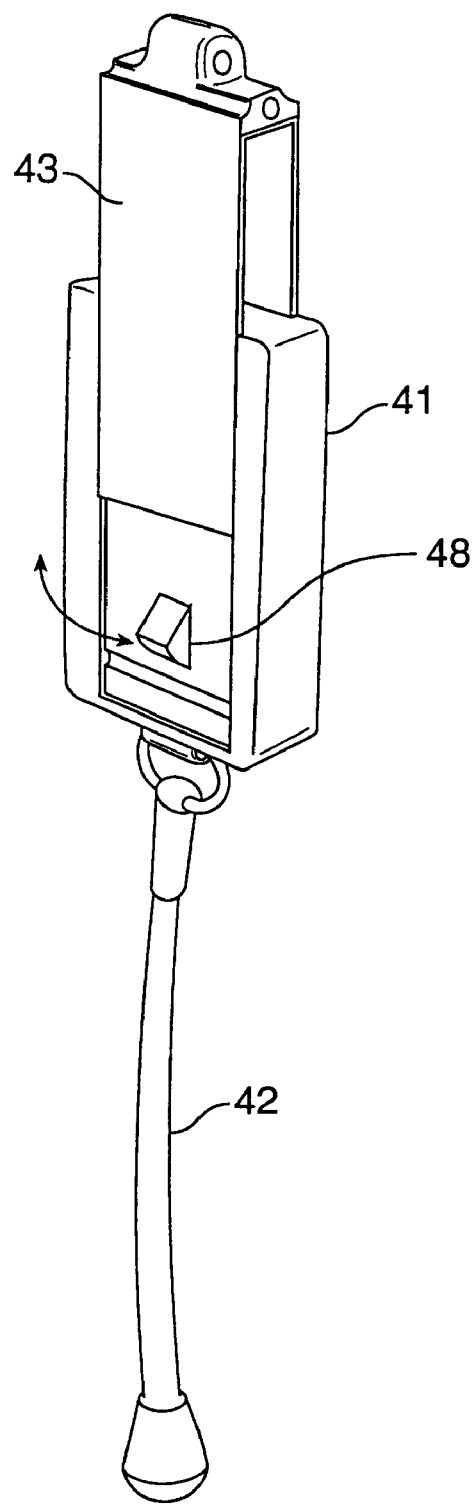

Referring to FIG. 4A, a magnetic element 46 housed in element 43 releases a magnetic reed switch 47 (FIG. 4E) in the housing 41 when element 43 is manipulated, typically away from the center of the housing. As shown in FIG. 4E, the reed switch 47 is located close to the element 46 when sliding element 43 is in the first position which is typically the signal off position. Alternatively as shown in FIGS. 4G and 4H, the sliding element 43 may release a button 48 when the sliding element 43 is moved away from the center of housing 41. Other activation devices may be used with the understanding that they will activate the signal transmitter 45 when the element 43 is moved away from the housing and deactivate the transmitter when the sliding element is returned to its first position. As shown in FIG. 4H, the sliding element 43 is extended from the housing 41, providing positive feedback that the switch is in a signal on position. With some prior art devices, it is unclear if the switch has been activated or not.

Figure 5A:
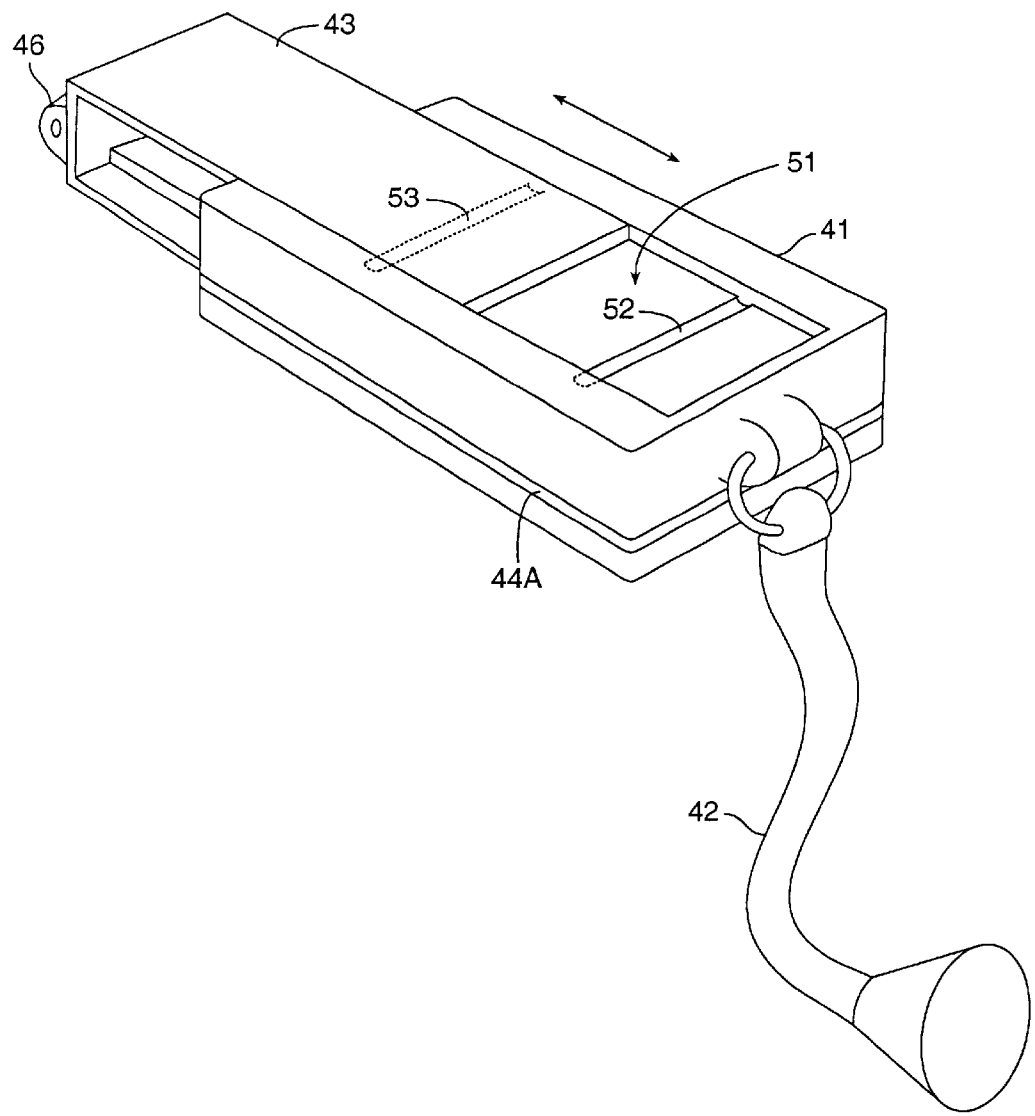
FIG. 5A is a perspective view of the remote transmitter with a sliding element moved away from the center of the remote transmitter.
Figure 5B:
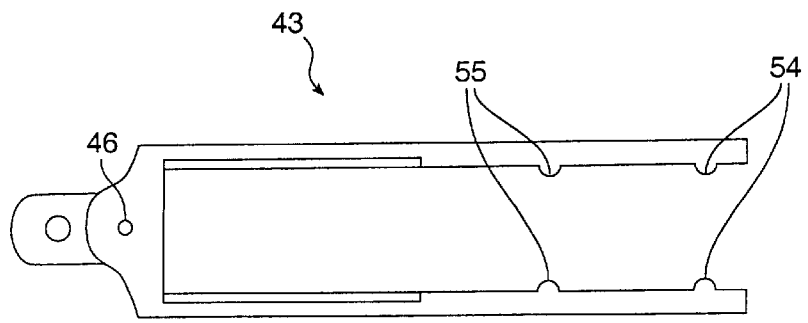
FIG. 5B is a side view of the sliding element removed from the housing of the remote transmitter.

Referring to FIGS. 4A and 5A, the user may move the sliding element 43 from a first position to the second position by pulling on user input 42 attached to the remote transmitter housing 41. It is expected that the user will wear the remote transmitter 10 as a necklace or attach the transmitter in some other fashion to their body to have the transmitter 10 within convenient operating distance during the course of their daily activities. Using cord 44 or a comparable attaching mechanism, the remote transmitter 10 will preferably be removably secured against a location L on the user (see FIG. 4F). In whatever manner the remote transmitter 10 is attached or secured to the user's body, a fixed point of reference will be provided against which the user input 42 may be pulled. Particularly for the elderly or the very young, it is preferable that the remote transmitter 10 be attached to a fixed point of reference such as the neck or the arms, as these appendages can provide resistive and pulling forces of their own to facilitate the activation of the remote transmitter 10.

Figure 6A:
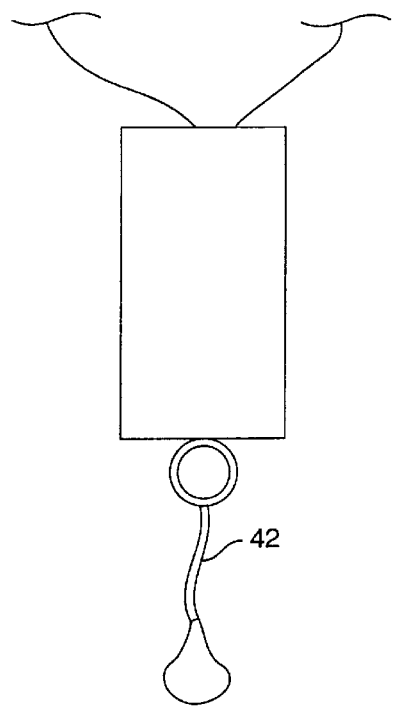
FIGS. 6A–6B illustrate an alternate embodiment of the remote transmitter.
Figure 6B:
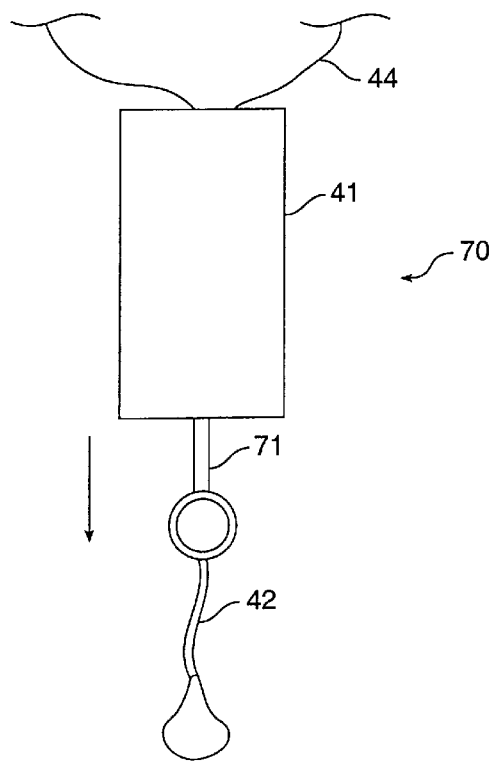

In a further embodiment of the remote transmitter, as shown in FIGS. 6A–B, cord 44 is attached to the housing 41 of remote transmitter 70. User input 42 is attached to a rod-like sliding element 71 which travels along a linear path inside of housing 41. In a fashion similar to the previous embodiment of the remote transmitter, cord 44 may be worn about the user's neck or attached to the user in some other fashion. User input 42 is pulled away from the center of housing 41 to activate the signal transmitter 45 within the housing 41. In the embodiment of FIGS. 6A–B, the signal transmitter 45 begins to send its digitally coded signal as soon as sliding element 71 leaves its signal off position. The sliding element 71 does not need to reach a designated signal opposition before it will start sending the coded digital signal. This aspect of the present invention may further facilitate the activation of the remote transmitter 10 for those users who may be unable to fully extend the sliding element 71.

Figure 7A:
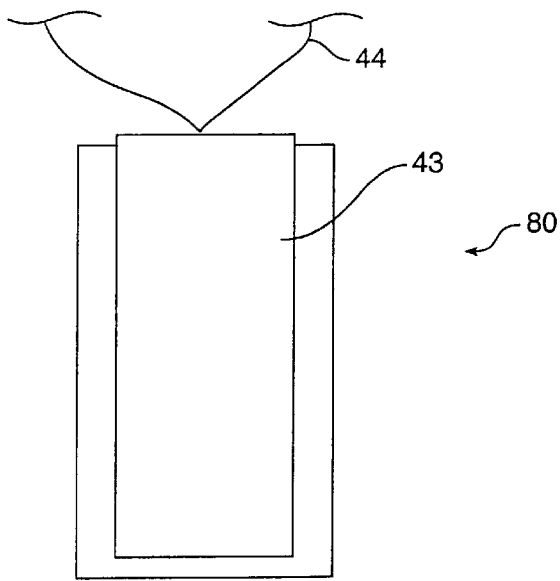
FIGS. 7A–7B show a device similar to the remote transmitter of FIG. 4A, except without the elongate element.
Figure 7B:
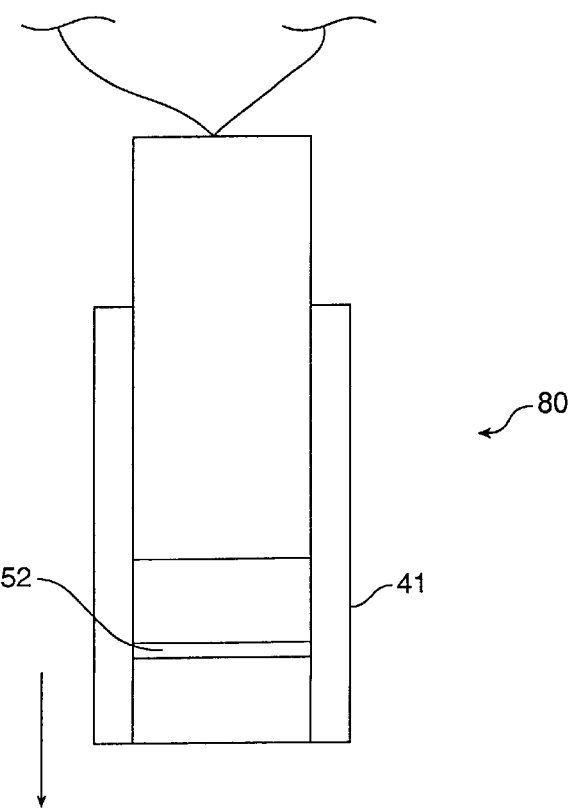

Referring now to FIGS. 7A–B, a still further embodiment of the present invention includes a sliding element 43 of remote transmitter 80 attached to cord 44. This embodiment of the present invention requires that the user pull on housing 41 of the remote transmitter 80 to activate the signal transmitter 45 within the housing 41. This embodiment is similar to the embodiment disclosed in FIG. 4A, except that user input 42 has been removed. Although user input 42 facilitates the activation of the remote transmitter 10, should the user input 42 be removed or lost, remote transmitter 10 is still capable of fully functioning as an emergency, remote transmitter.

FIGS. 8A–B depicts an even further embodiment of a remote transmitter 90, similar to the transmitter of FIGS. 7A–B. The housing 91 of the remote transmitter 90 has an ergonomic groove 92 molded into the surface of the housing 91 to facilitate grasping by the user. The grooves 92 are formed around the entire circumference of the housing 91 to facilitate either left-handed or right-handed operation of the remote transmitter 90. By grasping the housing 91, the user pulls the housing from a removably fixed location on the user's body. This pulling action will extend sliding element 93 away from the center of housing 91 of remote transmitter 90. This sliding action will move the element 93 away from a signal off position to activate the signal transmitter 45 housed within the housing 91.

In this particular embodiment, the sliding element 93 is a flexible cord material which extends away from the housing 91. Because of the flexible nature of the material, the cord material cannot be easily retracted by simply pushing the cord back into the housing 91. Furthermore, the element 93 may travel along a curved or annular path within the housing 91(not shown). When the sliding element 93 comprises a soft, flexible material as in the present embodiment, a retracting device 94 comprising a rotational spring or a conventional compression spring will provide retracting force to move the sliding element 93 to its original signal off position when the user pulls on the housing 91 when the sliding element 93 is extended. The retracting element 94 may comprise other devices so long as they provide a retracting force to pull the element 93 back into the housing 91. In the present embodiment, the sliding element 93 will remain extended away from the center of the housing 91 until the user pulls a second time on the housing 91 to cause the retracting element 94 within the housing 91 to pull sliding element 93 back towards the center of the housing. A digitally coded signal will continue to be transmitted until sliding element 93 is returned to its original signal off position.

Figure 9A:
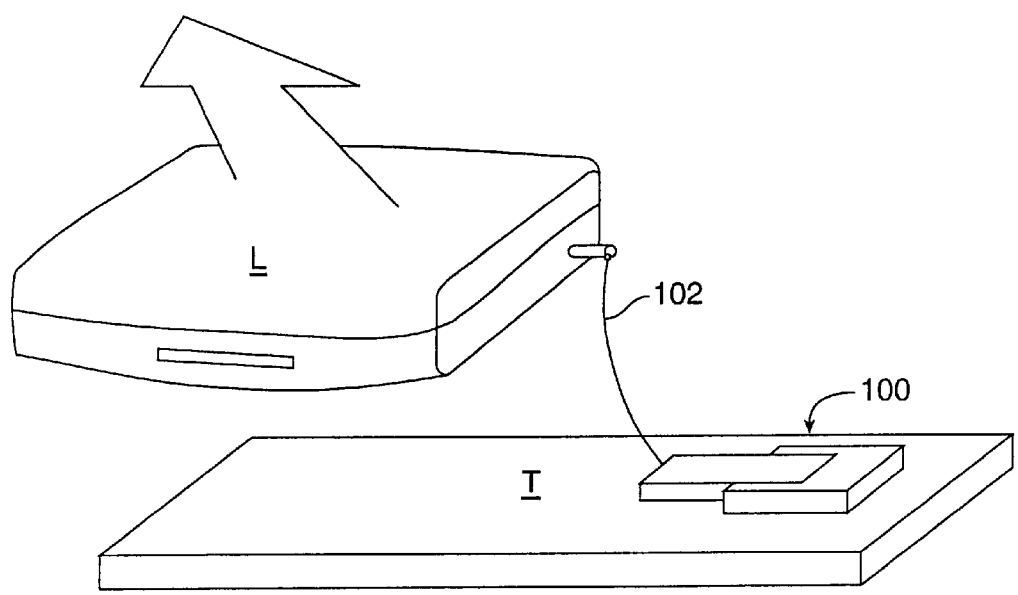
FIG. 9A shows the present invention used as a computer anti-theft device.

It should be understood that the device of the present invention may find uses wherever a simple, robust trigger or switch device is required. As shown in FIG. 9A, the remote transmitter may be adapted for use as an anti-theft device for equipment such as computer hardware. For example, when a laptop computer L is moved a predetermined distance from a remote security transmitter 100 attached to a table T, a security cord 102 coupled between the laptop L and the transmitter 100 will pull the sliding element 43, activating a security alarm (not shown). The transmitter 100 may send information such as the location of the disturbance to a distant control station (not shown), in addition to triggering an alarm signal.

Figure 9B:
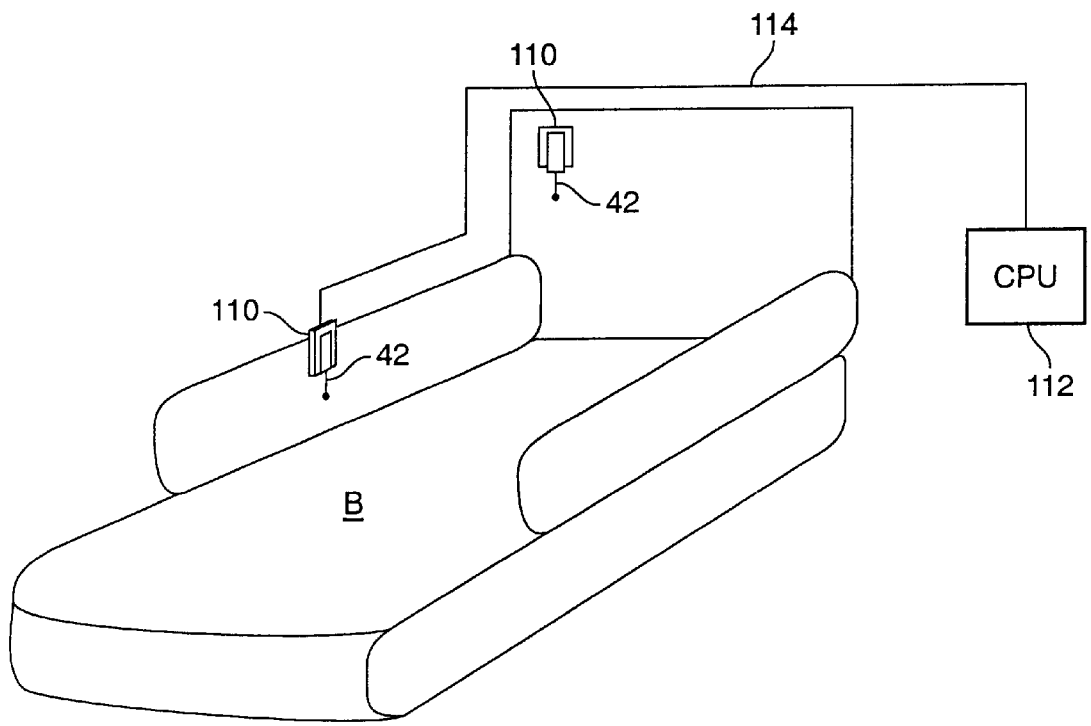
FIG. 9B depicts the present invention as a wireless device used with a hospital bed.

The present invention may also find further uses in the health care industry. As noted earlier, a transmitter switch using the sliding element 43 may find uses with hardwired systems, such as those that may be found with a hospital bed B (FIG. 9B). These typically hardwired remote transmitters 110 are coupled to a controller 112 or a central processing unit (CPU) by wires 114 to alert a nurse that a patient requires attention. Remote transmitter 110 provides many benefits such as ease of activation without the associated cost of incorporating a wireless remote signal transmitter.

According to the present invention, a method for activating a remote transmitter 10 of the present invention preferably comprises providing a remote transmitter with a housing and a user input extending from the housing. The user tactilely locates the user input with one or both of the user's hands. The user manipulates the user input to activate a remote transmitter to send signals to a controller such as a telephone. This prompts the controller to take some type of action, which in the case of a telephone, causes the dialing of a selected telephone number. Such manipulation preferably comprises pulling the elongate element, further extending the input from the housing.

Figure 10:
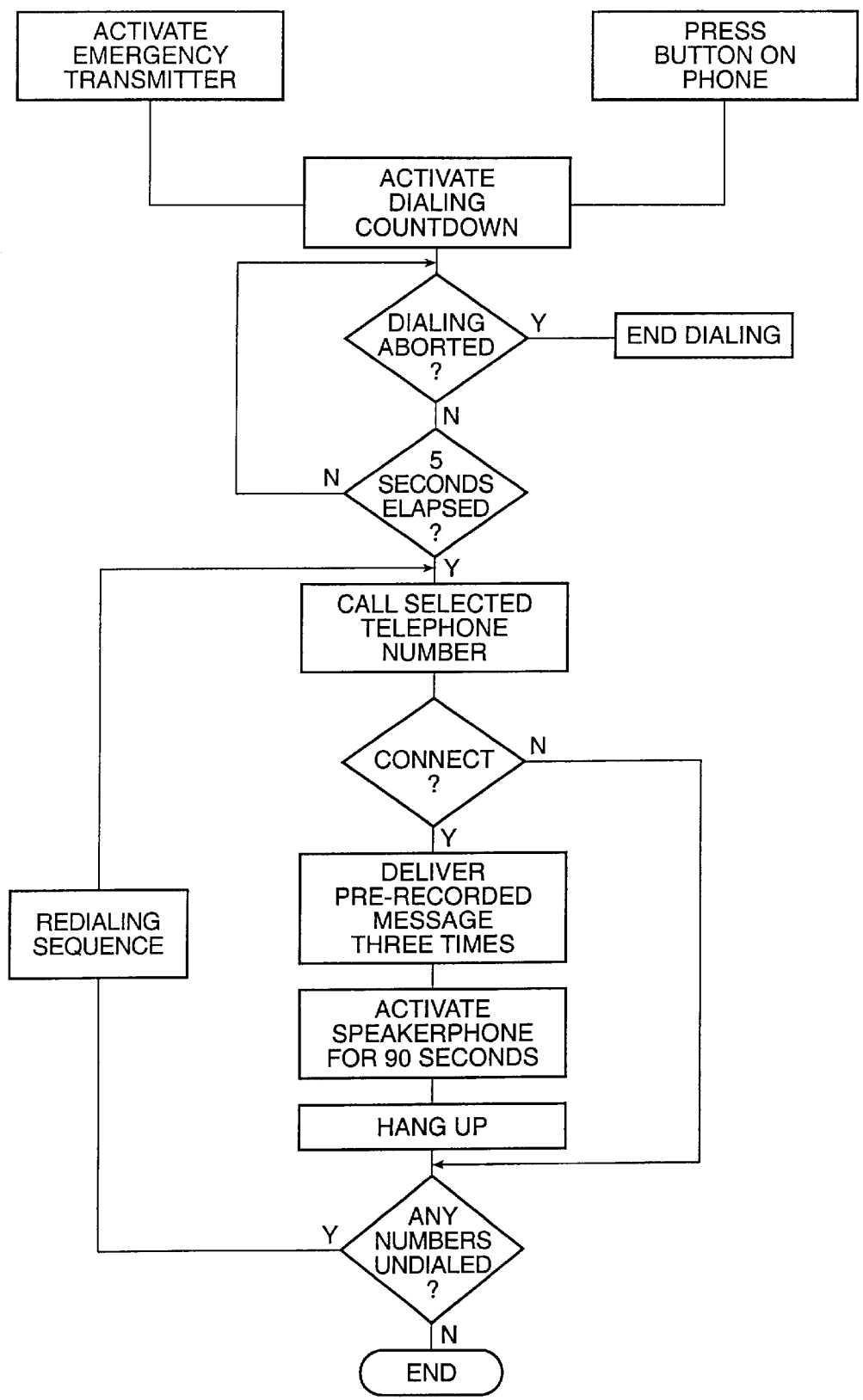
FIG. 10 is a schematic illustration of the calling procedure for the dialing system of the present invention.

A method for performing a calling procedure using a remotely activated telephone dialing system of FIG. 1 will be described with reference to FIG. 10. As shown in FIGS. 1 and 2, the telephone base unit 20 may be activated either by triggering the remote transmitter 10 or by depressing the emergency dialing button 21 on the telephone base unit 20. Either course of action will activate the telephone base unit 20 to perform the user's calling procedure comprising preselected, predetermined actions.

After the telephone base unit 20 has been activated, a period of time, typically 5 seconds, exists for aborting the predetermined actions of the telephone base unit. This allows the user to cancel any accidental activations of the predetermined emergency telephone dialing process. The user may abort the dialing process by either returning the sliding element 43 or switch to its original signal off position, or by pressing the emergency dialing button on the base unit 20 again. Should the time period elapse without any further action taken, the telephone base unit 20 will proceed with its predetermined emergency dialing process. Referring to the logic unit 32 of FIG. 3, the logic unit 32 will now direct the dialer 33 of the telephone base unit 20 to begin dialing a selected telephone number. In a preferred embodiment of the present invention, there will be a plurality of telephone numbers from which the dialer will select the first number from the plurality of selected telephone numbers.

The dialer 33 will attempt to connect to the selected telephone number. If the connection is unsuccessful, or if the line is busy, the method of the present invention will determine if any numbers remain undialed. So long as a single selected telephone number remains undialed, the logic unit 32 will activate a redialing sequence. In the redialing sequence, logic unit 32 will instruct dialer 33 to dial the next number from the plurality of selected telephone numbers. Should only one telephone number remain, dialer will redial this number. If during the redialing sequence the dialer cannot reach a selected telephone after three attempts, the dialer will stop dialing for 10 minutes, after which it will redial all numbers not contacted, continuing until all destinations or selected telephone numbers have been reached.

When the dialer 33 is successful in connecting to a selected telephone number, the logic unit 32 will instruct the automatic message sender 35 to send the prerecorded message. In preferred embodiments of the present invention, the prerecorded message will be played three times. After the message has been played, the controller will activate a speakerphone 26 on the telephone base unit 20 to allow for two-way communication between the selected telephone number and the user who has activated the emergency telephone base unit 20. Typically, the speakerphone 26 will remain activated for a set time period. A timer device 36 in the telephone base unit will allow the speakerphone to remain activated for a predetermined time period, such as 90 seconds. After the time period has expired, the telephone base unit will hang up or disconnect from the selected telephone number and the next number from the plurality of selected telephone numbers. Alternatively, if no other numbers remain to be dialed, the telephone base 20 will end the dialing process.

Although the foregoing invention has been described in detail for purposes of clarity of understanding, it will be obvious that certain modifications may be practiced within the scope of the appended claims.

What is claimed is:

1. A remote transmitter for use with a controller which is not connected to the remote transmitter, the transmitter comprising:

a housing;

a signal transmitter coupled to the housing;

a sliding element which is movably coupled to the housing and moves to a signal on position when said sliding element is moved away from the center of the housing; and a user input connected to said sliding element, said user input comprising a single elongate element extending a sufficient distance from the housing to allow the user to locate and manipulate the user input through tactile sensing, the single elongate element being pullable by the user away from the center of the housing to move the sliding element to the signal on position, wherein said sliding element in the signal on position remains coupled to the housing and activates the signal transmitter to send signals to the controller.

2. A remote transmitter of claim 1 wherein:

said housing includes a linear path; and said sliding element is disposed to translate along the linear path from a signal off position to the signal on position.

3. A remote transmitter of claim 2 wherein said sliding element has a lip for engaging a plurality of notches along said linear path of the housing.

4. A remote transmitter of claim 1 wherein said signal comprises a digitally encoded signal.

5. A remote transmitter of claim 1 wherein the sliding element is a flexible member, and further comprising a resilient member coupled with the flexible member for resiliently retracting the flexible member toward the center of the housing.

6. A remote transmitter of claim 5 wherein the resilient member comprises a spring.

7. A remote transmitter for use with a controller which is not connected to the remote transmitter, the transmitter comprising:

a housing;

a signal transmitter coupled to the housing;

a sliding element which moves to a signal on position when said sliding element is moved away from the center of the housing, wherein said sliding element is a flexible member; and a resilient retracting element coupled with said flexible member for retracting said flexible member toward the center of the housing, wherein said sliding element in the signal on position remains coupled to the housing and activates the signal transmitter to send signals to the controller.

8. A remote transmitter of claim 1 wherein the controller further comprises a dialer for dialing a plurality of telephone numbers when the sliding element is in the signal on position.

9. A remote transmitter of claim 1 wherein the controller further comprises an automatic message sender to send a prerecorded message to the selected telephone number when the sliding element is in the signal on position.

10. A remote transmitter of claim 1 wherein said controller comprises a speakerphone to provide two-way communication through the speakerphone after the selected telephone number is dialed.

11. A remote transmitter of claim 10 wherein said controller further comprises a timer device providing a fixed time period for said two-way communication.

12. A remote transmitter of claim 1 further comprising a wire connecting said transmitter to the controller.

13. A remote transmitter of claim 1 wherein said signal transmitter is adapted to send a cellular telephone signal.

14. A remote transmitter of claim 1 wherein said signal transmitter is adapted to send a signal indicating the location of the transmitter.

15. A remote transmitter of claim 1 wherein said sliding element remains visibly extended from the center of the housing in a signal on position and the signal transmitter transmits signals until the sliding element is moved to a signal off position.

16. A remote transmitter of claim 1 adapted for use in a hospital bed.

17. A system comprising:

a telephone base unit;

a signal receiver on said base unit;

a remote transmitter having a signal transmitter and a user input for activating the signal transmitter to send signals to the receiver on the base unit, said remote transmitter comprising a housing, said user input comprising a single elongate element extending a sufficient distance from the housing to allow the user to locate and manipulate the user input through tactile sensing, said single elongate element being pullable by a user away from the center of the housing to activate the signal transmitter while remaining coupled with the housing;

an automatic telephone number dialer on the telephone base unit activated by the signal receiver to dial a selected telephone number;

an automatic message sender which sends a prerecorded message to the selected telephone number; and a speakerphone on said base unit providing two-way communication after the prerecorded message has been sent.

18. A system of claim 17 wherein said remote transmitter is activated when said user input is moved away from the center of the housing.

19. A method for activating a remote transmitter comprising the steps of:

providing a remote transmitter with a housing and a user input comprising a single elongate element extending from the housing by a sufficient distance to allow a user to locate and manipulate the user input through tactile sensing;

tactilely locating the user input with one or both of the user's hands;

manipulating the user input by pulling the single elongate element to further extend the single elongate element from the housing while remaining coupled with the housing to activate the remote transmitter; and contacting a controller.

20. A method of claim 19 wherein:

the providing step includes providing a wireless signal transmitter in the remote transmitter; and said contacting step comprises sending signals to a telephone with said signal transmitter to activate said telephone and cause dialing of a selected telephone number.

21. A method of claim 19 wherein the remote transmitter further includes a spring coupled with the user input to resiliently retract the single elongate element toward the housing, and further comprising releasing the single elongate element to permit the spring to retract the single elongate element toward the housing.

22. A remote transmitter of claim 7 further comprising a user input connected to said sliding element, said user input extending a sufficient distance from the housing to allow the user to locate and manipulate the user input through tactile sensing.

23. A remote transmitter of claim 7 wherein the retracting element comprises a spring coupled with the flexible member.

\* \* \* \* \*